US007403775B2

(12) United States Patent
Patel et al.

(10) Patent No.: US 7,403,775 B2
(45) Date of Patent: Jul. 22, 2008

(54) ROAMING GATEWAY FOR SUPPORT OF ADVANCED VOICE SERVICES WHILE ROAMING IN WIRELESS COMMUNICATIONS SYSTEMS

(75) Inventors: Krishnakant Patel, Dallas, TX (US); Gorachand Kundu, Bangalore (IN); Ravi Ayyasamy, Richardson, TX (US); Basem A. Ardah, Plano, TX (US)

(73) Assignee: Kodiak Networks, Inc., San Ramon, CA (US)

(*) Notice: Subject to any disclaimer, the term of this patent is extended or adjusted under 35 U.S.C. 154(b) by 589 days.

(21) Appl. No.: 11/129,268

(22) Filed: May 13, 2005

(65) Prior Publication Data
US 2005/0221819 A1 Oct. 6, 2005

Related U.S. Application Data

(63) Continuation-in-part of application No. 10/515,556, filed as application No. PCT/US03/16386 on May 23, 2003, application No. 11/129,268, which is a continuation-in-part of application No. PCT/US2004/023038, filed on Jul. 16, 2004.

(60) Provisional application No. 60/576,094, filed on Jun. 2, 2004, provisional application No. 60/571,075, filed on May 14, 2004, provisional application No. 60/492,650, filed on Aug. 5, 2003, provisional application No. 60/488,638, filed on Jul. 18, 2003, provisional application No. 60/407,168, filed on Aug. 30, 2002, provisional application No. 60/382,981, filed on May 24, 2002, provisional application No. 60/383,179, filed on May 24, 2002.

(51) Int. Cl.
*H04Q 7/20* (2006.01)

(52) U.S. Cl. .................. 455/432.1; 455/422.1; 455/518

(58) Field of Classification Search .............. 455/432.1, 455/422.1, 428, 517, 518, 519, 520, 521, 455/416, 515; 370/260, 432
See application file for complete search history.

(56) References Cited

U.S. PATENT DOCUMENTS 5,711,011 A 1/1998 Urs et al.

(Continued)

FOREIGN PATENT DOCUMENTS

WO WO 00/79825 12/2000

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141.

(Continued)

*Primary Examiner*—Melur Ramakrishnaiah
(74) *Attorney, Agent, or Firm*—Gates & Cooper LLP (57) ABSTRACT

A roaming gateway for support of advanced voice services while roaming in wireless communications systems. The roaming gateway supports push-to-talk (P2T) calls, or other advanced voice services, when P2T subscribers roam from their home network (i.e., a network operated by their service provider where the subscriber's profile resides) into a foreign network (i.e., a network operated by another service provider). The roaming gateway is a specialized version of a real-time exchange that is located in the home network and is connected to mobile switching centers in foreign networks, so that the mobile switching centers in the foreign networks need not be programmed for the advanced voice services.

22 Claims, 5 Drawing Sheets

U.S. PATENT DOCUMENTS

| | | | |
|---|---|---|---|
| 5,987,318 | A | 11/1999 | Alperovich et al. |
| 6,021,326 | A | 2/2000 | Nguyen |
| 6,138,011 | A | 10/2000 | Sanders, III et al. |
| 6,304,558 | B1 | 10/2001 | Mysore |
| 6,411,815 | B1 | 6/2002 | Balasuriya |
| 6,477,366 | B1 | 11/2002 | Valentine et al. |
| 6,661,878 | B1 | 12/2003 | Mirashrafi et al. |
| 6,898,436 | B2 * | 5/2005 | Crockett et al. .............. 455/518 |
| 2001/0005372 | A1 | 6/2001 | Cave et al. |
| 2002/0196781 | A1 | 12/2002 | Salovuori |
| 2003/0016632 | A1 | 1/2003 | Refai et al. |
| 2003/0078064 | A1 | 4/2003 | Chan |
| 2003/0190888 | A1 | 10/2003 | Mangal et al. |
| 2004/0057449 | A1 | 3/2004 | Black |
| 2004/0259580 | A1 | 12/2004 | Florkey et al. |
| 2005/0202807 | A1 | 9/2005 | Ayyasamy et al. |
| 2005/0221819 | A1 | 10/2005 | Patel et al. |
| 2005/0239485 | A1 | 10/2005 | Kundu et al. |
| 2005/0254464 | A1 | 11/2005 | Patel et al. |
| 2005/0261016 | A1 | 11/2005 | Patel et al. |
| 2006/0019654 | A1 | 1/2006 | Farrill |
| 2006/0030347 | A1 | 2/2006 | Biswas |
| 2006/0189337 | A1 | 8/2006 | Farrill et al. |
| 2006/0234687 | A1 | 10/2006 | Patel et al. |
| 2007/0037597 | A1 | 2/2007 | Biswas et al. |
| 2007/0037598 | A1 | 2/2007 | Ayyasamy et al. |

FOREIGN PATENT DOCUMENTS

| | | |
|---|---|---|
| WO | WO0079825 | 12/2000 |
| WO | WO 03/101007 | 12/2003 |
| WO | WO2005009006 | 1/2005 |
| WO | WO2005112494 | 11/2005 |
| WO | WO2005115032 | 12/2005 |
| WO | WO2005117474 | 12/2005 |
| WO | WO2006105287 | 10/2006 |

OTHER PUBLICATIONS

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive—Skype, May 22, 2004, pp. 1-2. XP002345780 http://web.archive.org/web/20040522201727 http://www.skype.com.

Trachwell: "TrackWell Software and Tetra Iceland deliver value added services to Tetra users", Trackwell.com, Oct. 2002, pp. 1-1. XP002345781 http://www.trackwell.com/news/news_twandtetra.htm.

* cited by examiner

ROAMING GATEWAY FOR SUPPORT OF ADVANCED VOICE SERVICES WHILE ROAMING IN WIRELESS COMMUNICATIONS SYSTEMS

CROSS REFERENCE TO RELATED APPLICATIONS

This application claims the benefit under 35 U.S.C. Section 119(e) of the following co-pending and commonly-assigned U.S. provisional patent application:

Ser. No. 60/571,075, filed on May 14, 2004, by Krishnakant Patel, Gorachand Kundu, Ravi Ayyasamy, and Basem Ahmad Ardah, entitled ROAMING GATEWAY FOR SUPPORT OF ADVANCED VOICE SERVICES WHILE ROAMING, which application is incorporated by reference herein.

This application is a continuation-in-part and claims the benefit under 35 U.S.C. Sections 119, 120 and/or 371 of the following co-pending and commonly-assigned patent applications:

Ser. No. 10/515,556, filed on Nov. 23, 2004, by Gorachand Kundu, Ravi Ayyasamy, and Krishnakant Patel, entitled DISPATCH SERVICE ARCHITECTURE FRAMEWORK, which application claims the benefit under 35 U.S.C. Section 371 of the following co-pending and commonly-assigned PCT international patent application:

Serial Number PCT/US03/16386, filed on May 23, 2003, by Gorachand Kundu, Ravi Ayyasamy, and Krishnakant Patel, entitled DISPATCH SERVICE ARCHITECTURE FRAMEWORK, which application claims the benefit under 35 U.S.C. Section 119(e) of the following co-pending and commonly-assigned U.S. provisional patent applications:

Ser. No. 60/382,981, filed on May 24, 2002, by Gorachand Kundu, Ravi Ayyasamy, and Krishnakant Patel, entitled RADIO GATEWAY ARCHITECTURE FRAMEWORK, Ser. No. 60/383,179, filed May 24, 2002, by Gorachand Kundu, Ravi Ayyasamy, and Krishnakant Patel, entitled DISPATCH SERVICE ARCHITECTURE FRAMEWORK, and Ser. No. 60/407,168, filed Aug. 30, 2002, by Gorachand Kundu, Ravi Ayyasamy, and Krishnakant Patel, entitled DISPATCH SERVICE ARCHITECTURE FRAMEWORK, and Ser. No. PCT/US04/23038, filed on Jul. 16, 2004, by F. Craig Farrill, Bruce D. Lawler, and Krishnakant M. Patel, entitled PREMIUM VOICE SERVICES FOR WIRELESS COMMUNICATIONS SYSTEMS, which application claims the benefit under 35 U.S.C. Section 119(e) of the following co-pending and commonly-assigned U.S. provisional patent applications:

Ser. No. 60/488,638, filed on Jul. 18, 2003, by F. Craig Farrill, Bruce D. Lawler and Krishnakant Patel, entitled REAL-TIME EXCHANGE, Ser. No. 60/492,650, filed Aug. 5, 2003, by Bruce D. Lawler, Krishnakant Patel, and F. Craig Farrill, entitled CDMA PRESS-TO-TALK (P2T) PROOF-OF-CONCEPT DEMONSTRATION, and Ser. No. 60/576,094, filed Jun. 2, 2004, by Craig Farrill, Bruce Lawler, and Krishnakant Patel, entitled TECHNIQUE FOR ZERO DELAY CALL SET-UP IN P2T SYSTEMS, all of which applications are incorporated by reference herein.

BACKGROUND OF THE INVENTION

1. Field of the Invention

This invention relates in general to wireless communications systems, and more specifically, to a roaming gateway for support of advanced voice services while roaming in wireless communications systems.

2. Description of Related Art

Group-based voice services, such as two-way half-duplex voice calls within a group, also known as "Push-to-Talk," "Press-to-Talk," PTT or P2T, have enormous revenue earnings potential for wireless networks, such as cellular networks and personal communications systems (PCS) networks. Corporate subscribers primarily use such services for coordinating field people or fleet users from a central location.

Currently, there are three major approaches employed in providing group-based voice services such as P2T in wireless networks. One approach requires the installation of a dedicated private network, parallel to the wireless network, to support the group-based voice services. NEXTEL uses such a system, based on a solution developed by MOTOROLA known as IDEN. However, a dedicated private network is costly to install and maintain and is employed by a few public wireless carriers. Also, the IDEN system is non-standard, and hence cannot be used in standard wireless communications networks, such as those based on CDMA and GSM.

Another approach is based on Voice over IP (VoIP) technologies. While this approach promises compliance with newer and emerging standards, such as GPRS (General Packet Radio Service), UMTS (Universal Mobile Telecommunications System), etc., it does not provide a solution for carriers employing wireless networks based on existing standards, such as GSM (Global System for Mobile Communications), CDMA (Code Division Multiple Access), etc. However, even for the newer standards, solutions based on VoIP have serious drawbacks, including slower call setup, significant overhead, increased susceptibility to packet losses, low bit rate voice coders (vocoders), and significant modifications to the mobile handset. There is a need, instead, for solutions that require only minimal upgrades to the handset.

Still another approach is that defined in the co-pending and commonly-assigned patent applications cross-referenced above and incorporated by reference herein. In this approach, group-based voice services are provided by a real-time exchange or dispatch gateway that interfaces to the wireless network to provide the group-based voice services therein, wherein both the real-time exchange and mobile handsets that use the group-based voice services communicate with each other using call setup and in-band signaling within the wireless network.

Notwithstanding these innovations, there is a need in the art for a roaming gateway for support of advanced voice services while roaming in wireless communications systems. The present invention aims to satisfy this need.

SUMMARY OF THE INVENTION

To overcome the limitations in the prior art described above, and to overcome other limitations that will become apparent upon reading and understanding the present specification, the present invention discloses a roaming gateway for support of advanced voice services while roaming in wireless communications networks. The roaming gateway supports push-to-talk (P2T) calls, or other advanced voice services, when P2T subscribers roam from their home network (i.e., a network operated by their service provider where the subscriber's profile resides) into a foreign network (i.e., a network operated by another service provider). The roaming gateway is a specialized version of a real-time exchange that is located in the home network, and is connected to mobile switching centers in foreign networks, so that the mobile switching centers in the foreign networks need not be programmed for the advanced voice services.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention provides a roaming gateway for support of advanced voice services while roaming in wireless communications networks.

Network Architecture

Figure 1:
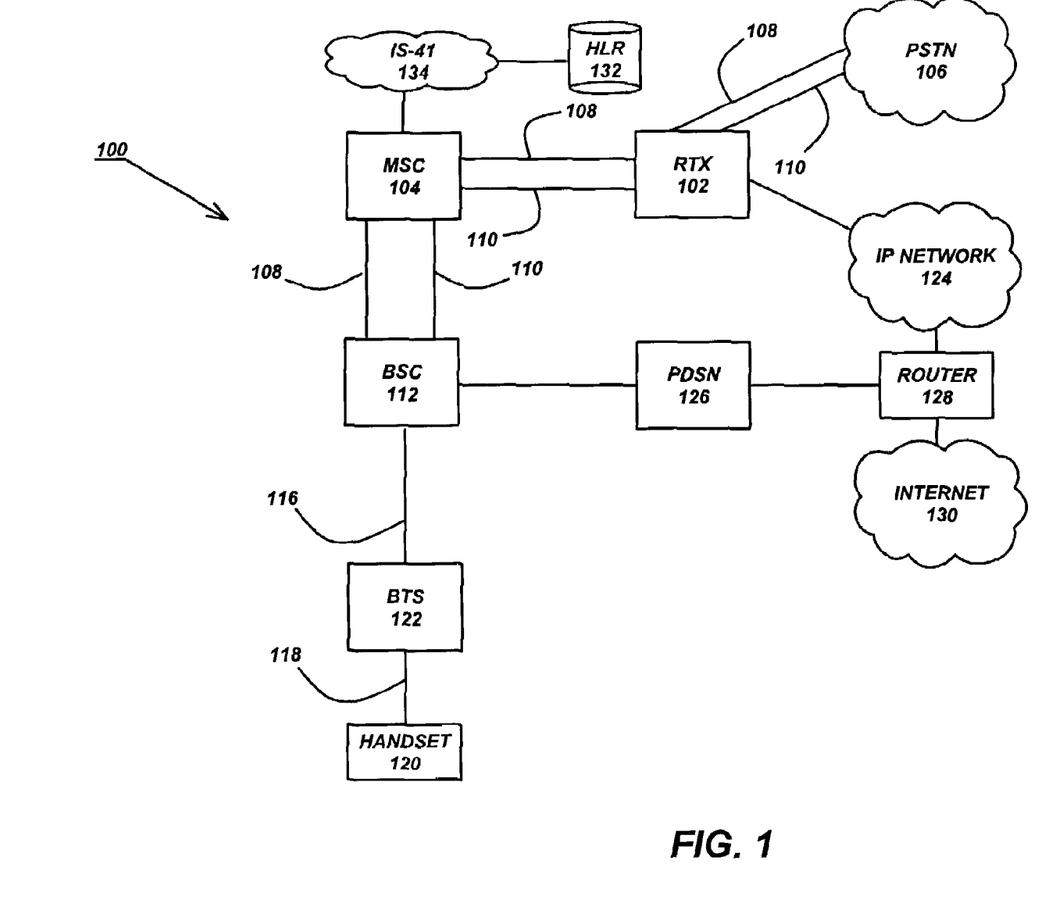
FIG. 1 is a block diagram that illustrates an exemplary embodiment of a wireless communications network according to a preferred embodiment of the present invention.

FIG. 1 is a block diagram that illustrates an exemplary embodiment of a wireless communications network according to a preferred embodiment of the present invention.

Within the network 100, an RTX (Real-Time Exchange) 102, previously known as a Dispatch Gateway (DG), communicates with a MSC (Mobile Switching Center) 104 and PSTN (Public Switched Telephone Network) 106 using SS7—ISUP/WIN/CAMEL (Signaling System 7—Integrated Services Digital Network User Part/Wireless Intelligent Network/Customized Applications for Mobile Enhanced Logic) messages at a signaling plane 108. A bearer path 110 implements a TDM (Time Division Multiplexing) interface carrying PCM (Pulse Code Modulation) or TFO (Tandem Free Operation) voice frames. Support for TFO in this path 110 is negotiated between a BSC (Base Station Controller) 112 and the RTX 102 for each originating and terminating leg of a group call.

When a subscriber originates a group voice services call, such as a P2T call, the MSC 104 routes the call to the RTX 102. The MSC 104 also requests the BSC 112 via 116 to establish a radio traffic path 118 with a mobile unit or handset 120 via the BTS (Base Transceiver Station) 122 (as it does for a normal cellular call). At this time, the BSC 112 tries to negotiate TFO (if it is supported) on a TDM link with the far end (in this case, the RTX 102).

At the same time (after the MSC 104 terminates the group call request to the RTX 102), the RTX 102 identifies the terminating group users and their MS-ISDN (Mobile Station-Integrated Services Digital Network) numbers. It sends an ISUP call origination request for each terminating handset 120. It may send requests directly to the MSC 104, PSTN 106 or IP network 124 via a PDSN (Public Data Switched Network) 126, Router 128, and/or Internet/Intranet 130, depending on the routing table configuration for terminating MS-ISDN numbers. Once the bearer path 110 is established, the RTX 102 begins a negotiation with the far end (in this case, the terminating BSC 112) for each terminating leg to a handset 120.

Once bearer paths 110 are established for originating and terminating legs for a group call, the RTX 102 switches (or duplicates) voice frames from the originating handset 120 to all terminating handsets 120.

The RTX 102 may use an IP network 124 or the Internet/Intranet 130 for two different purposes. The IP network 124 or the Internet/Intranet 130 can be used in a toll bypass mode where two RTXs 102 can exchange voice traffic bypassing the PSTN 106. However, each RTX 102 is responsible for terminating traffic to its closest MSC 104. In this case, the IP network 124 or the Internet/Intranet 130 is used as a backbone transport of voice traffic between two RTXs 102.

The IP network 124 or the Internet/Intranet 130 can also be used for a registration and presence application. Since the MSC 104 will not direct a registration request from a handset 120 to the RTX 102 (because it would require changes in the MSC 104), the latter does not have any information of the registered handsets 120. To circumvent this issue, a registration and presence application runs over an IP stack in the handset 120. After the handset 120 registers for a data interface (i.e., obtaining an IP address) with the PDSN 126, the registration and presence application in the handset 120 registers with the RTX 102 using its IP address. The RTX 102 also uses this IP interface to update the presence information of other group members to a handset 120. There is also provision to use SMS (Short Message Service) transport to carry presence messages if an operator chooses to use SMS over a data channel.

During roaming, a Home Location Register (HLR) 132 can be accessed via the MSC 104 and an IS-41 link 134. The HLR 132 can be used to track the presence of members of a group within the network and updates the mobile handsets 120 for those members with the network availability of other members of the group.

Real Time Exchange

Figure 2:
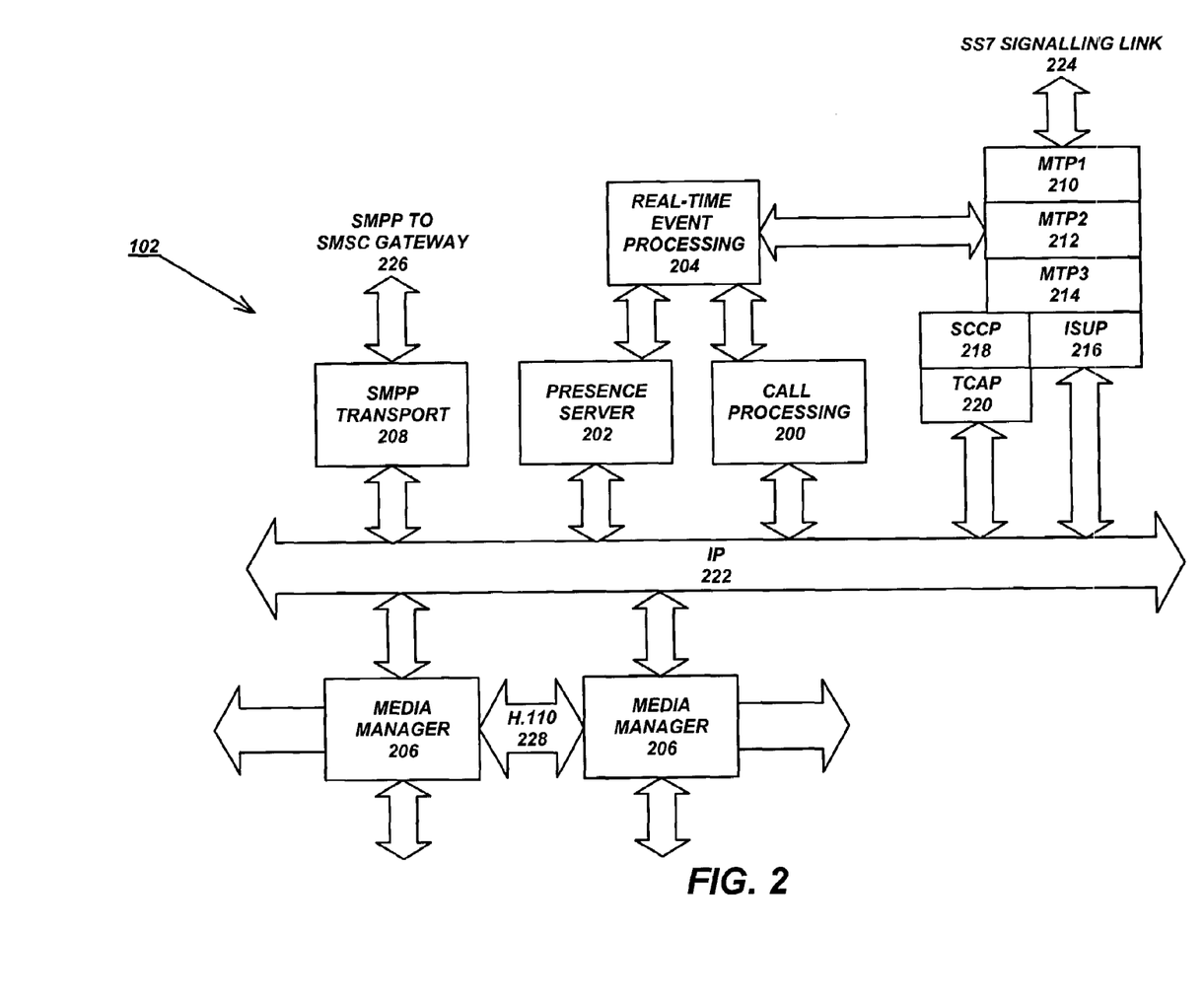
FIG. 2 illustrates an architecture for a real-time exchange according to the preferred embodiment of the present invention.

FIG. 2 illustrates an architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) gateway using the SMPP protocol 226. The Media Managers 204 communicate among themselves using the H.110 protocol 228.

The operation of these various components are described in the co-pending and commonly-assigned patent applications cross-referenced above and incorporated by reference herein.

Roaming Between Networks

Figure 3:
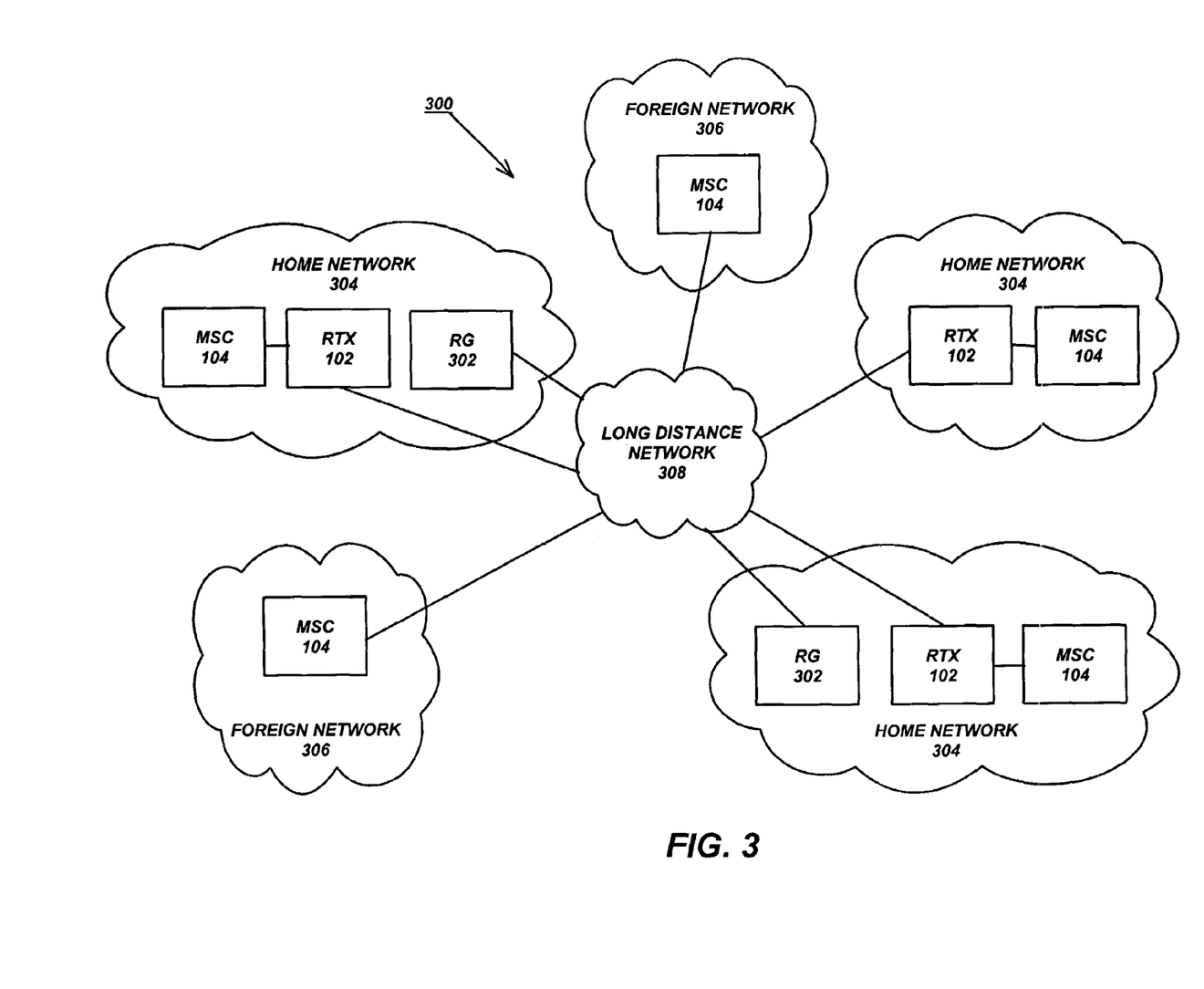
FIG. 3 is a block diagram that illustrates an exemplary embodiment of roaming between home and foreign wireless communications networks according to a preferred embodiment of the present invention.

FIG. 3 is a block diagram that illustrates an exemplary embodiment 300 of roaming between home and foreign wireless communications networks according to a preferred embodiment of the present invention. In this diagram, a Roaming Gateway (RG) 302 supports P2T calls when P2T subscribers roam from their home network 304 (i.e., a network 304 operated by their service provider where the subscriber's profile resides) into a foreign network 306 (i.e., a network operated by another service provider). The RG 302 is a specialized version of the RTX 102 that is located in the home network 304, and thus comprises the architecture described in FIG. 2.

The RG 302 is connected to one or more RTXs 102 within the home network 304 through a long distance network 308. The RTX 102 is also connected to at least one MSC 104 within the home network 304 through the long distance network 308 to provide access facilities (loc originating and terminating) to P2T subscribers. In addition, the RG 302 is connected to at least one MSC 104 within a foreign network 306 through the long distance network 308, wherein the MSC 104 in the foreign network 306 routes a P2T call via the long distance network 308 to the RG 302 and the RG 302 sets up the P2T call.

When the roaming P2T subscriber wants to originate a P2T call, the P2T client application in the handset 120 originates the call using a Directory Number for the RG 302, so that the MSC 104 in the foreign network 306 can establish a call with the RG 302 (in a manner similar to a mobile originated, land terminated call). The RG 302 authenticates the originating P2T subscriber and establishes a voice path with the handset 120. The RG 302 then receives a group index (in the case of a group call through the voice path) from the handset 120 via DTMF, retrieves a Group ID for identifying the group using the group index, and establishes a call with the RTX 102 in the group home network 304 (i.e., a network 304 operated by their service provider where the group profile resides) through the long distance network 308. The group home RTX 102 terminates the call to all other members of the group. Also, the RG 302 itself can terminate the call to all other members of the group without involving the group home RTX 102, if it stores a copy of the group profile.

Functional Blocks in the Roaming Gateway

Figure 4:
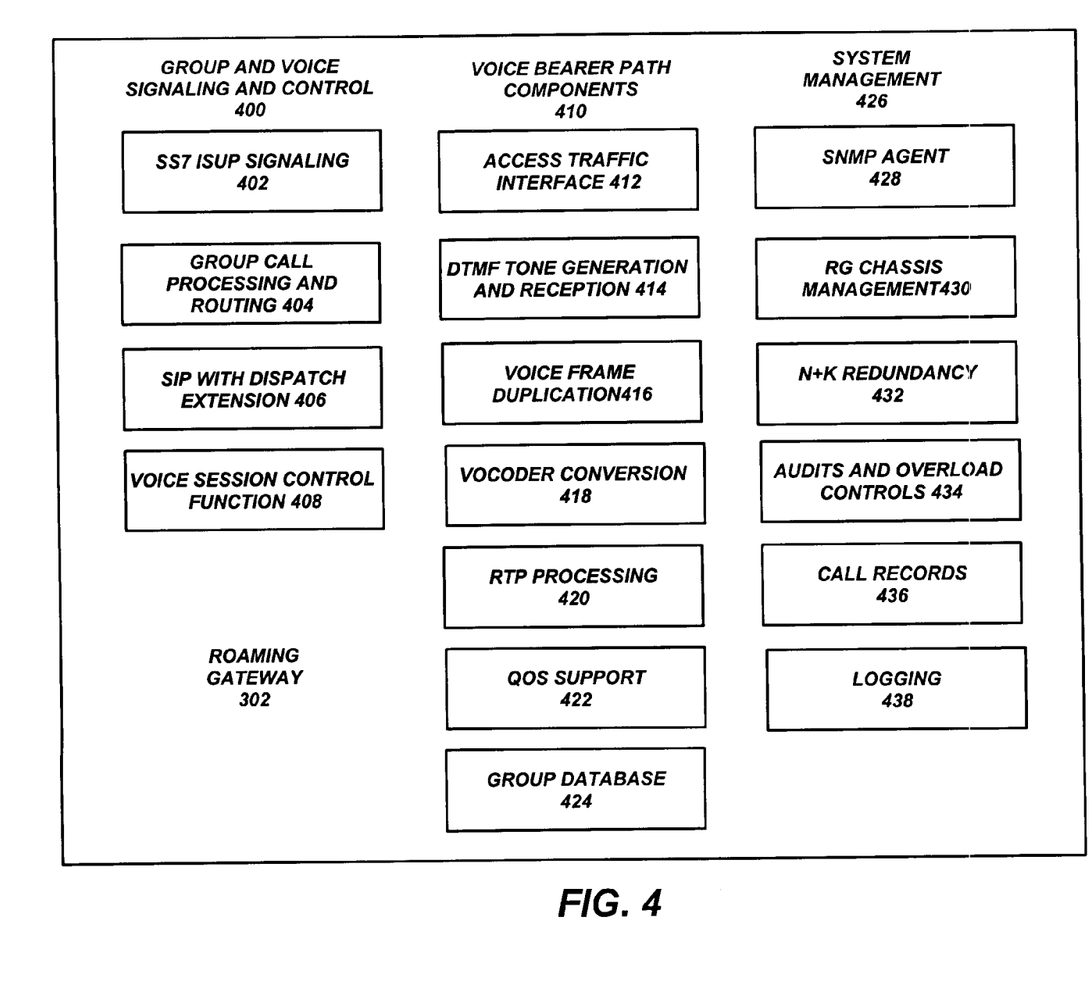
FIG. 4 is a block diagram that illustrates the major functional blocks in the roaming gateway according to a preferred embodiment of the present invention.

FIG. 4 is a block diagram that illustrates the major functional blocks in the RG 302 according to a preferred embodiment of the present invention.

1. Group Voice Signaling and Control 400—This subsystem is involved in the control plane for processing group call requests, communicating with the RTX 102, MSC 104 or PSTN 106, controlling its own bearer path ports and handling presence notifications. It consists of following important modules SS7 ISUP, WIN, CAMEL Signaling 402—This module is responsible for handling all ISUP messages and maintaining ISUP related call state machines. It routinely monitors the health of TDM circuits and initiates/terminates ISUP maintenance requests. It interfaces with group call processing layer to originate or terminate call requests. The WIN/CAMEL interfaces are used by the MSC 104 to notify the RG 302 about the dialed digits (group id) when an origination trigger condition is met. In this way, the RG 302 can start setting up the terminating legs parallel to the originating leg radio setup. This gives faster group call setup.

Group Call Processing and Routing 404—This module processes group call requests, maintains call state machines for each originating and terminating call leg, and routes call according to the called MS-ISDN numbers. It also interfaces with a group and subscriber database for retrieving group and subscriber related information, and validating the subscribers' authenticity. It also controls the floor of the group call by allowing only one user to speak at any time during the call session. A Routing function decides whether the call needs to be terminated to the MSC 104, PSTN 106 or IP network 124 (Inter-RG 302 call to bypass toll).

SIP with Dispatch Extension (RG-RTX) 406—This module enables an RG 302 and RTX 102 to communicate with each other at the signaling plane. The RG 302 and RTX 102 may communicate to establish a call in a toll bypass mode or to retrieve group information for a group from its home RTX 102. They may also exchange signaling messages during a call session to indicate call continuation or call re-initiation requests. Standard SIP message set may need to be modified to suit these RG-RTX group call control features.

Voice Session Control Function 408—This module acts as a media control agent to perform incoming and outgoing port allocation, to control voice frame duplication and media switching. It is a lower layer function to control bearer paths within the system. It also interacts with bearer the path to generate and receive DTMF tones. It interfaces with a group call processing layer to send and receive call control messages.

2. Voice Bearer Path Components 410—This subsystem is responsible for handling voice frames in the bearer path. It also receives and generates DTMF tones and notifies the media control application. It has following major functional components Access Traffic Interface (TFO/PCM) 412—This module is responsible for the terminating or originating PCM/TFO interface from/to the MSC 104 or PSTN 106. It handles TFO negotiation procedures with originating and terminating BSC 112. Please note that for a TFO-TFO call (where both originating and terminating legs support TFO), this function does not modify the voice payload content. In this scenario, it just accepts PCM frames from an originating port, buffers it for 20 ms, extracts signaling information (if anything is carried) and switches the payload to the terminating legs as a PCM frame (carrying TFO). However, if any of the leg does not support TFO, this function provides input to a vocoder conversion function to change the packet format to PCM for that leg. Please note that all legs of a group call will support PCM, but some of them may support TFO (since TFO requires a BSC 112 upgrade and it is assumed that service providers may not have upgraded all BSCs 112 in their network at the time of deployment of group voice service). The RG 302, by default, will try to negotiate TFO with the remote terminating BSC 112. If the remote BSC 112 doesn't respond, the RG 302 will establish a pure PCM interface.

DTMF Tone Generation and Reception 414—In this architecture, the group voice service application in the mobile handset 120 and the RG 302 exchange a set of defined in-band DTMF tones as call control events to regulate the group call. These include an initiating pause request by the originator, initiating call continuation request by a user and communicating state change requests to the handsets 120 by the RG 302. This functional component sits on the bearer path to detect DTMF tones that are originated by the group voice service application in the handsets 120. Once detected, it notifies the media control function. Similarly, upon receiving instruction from the media control function, it generates DTMF tones to be received and analyzed by the corresponding application in the handsets 120.

Voice Frame Duplication 416—In the group voice application, voice frame duplication plays a key role as incoming frames need to be copied or switched to many outgoing ports. A multicasting control technique is used whereby it reduces number of frames at the back plane for internal frame switching and at the same time minimizes number of packets to be carried to an RTX 102 302 (over the IP network 124) that controls a set of end points of the group call.

Vocoder Conversion 418—A group call can involve legs where some of them do not support TFO. In that scenario, a vocoder conversion is needed at the RG 302 between TFO, which carries an EVRC format payload for CDMA, and EFR/AMR (Enhanced Full Rate/Adaptive Multi Rate) voice coding for GSM, and PCM. An alternate solution to vocoder conversion can be to support all call legs on PCM (every leg supports this as default). But, this would reduce MOS for call legs that support TFO. It is assumed that TFO will be introduced in most parts of the network by the time group service is deployed in the field.

RTP Processing (Inter-RG Traffic) 420—An RG 302 and RTX 102 together may get involved in transporting voice frames over the IP network 124. This is used to bypass the PSTN 106. In this scenario, the RTP protocol is used to carry voice frames either in the form of TFO/PCM (G.711) between the RG 302 and RTX 102. Only one RTP stream is used for a group call between the RG 302 and RTX 102. The receiving RTX 102 may internally connect that single RTP source to many access ports (TDM). Please note that while sending RTP packet, the source RG 302 does not change the voice payload format. The PCM frames (carrying TFO) are buffered and packetized at 20 ms interval and sent in an RTP envelope without modifying the content. The receiving RTX 102, depending on supported formats on access legs (PCM or TFO), may change the payload format.

QoS (Quality of Service) Support 422—The RG 302 may require the use of RSVP (Resource Reservation Protocol) or proprietary QoS protocols to indicate high priority for delivering packets carrying voice frames.

3. Group Database 424—This subsystem is the repository of group subscriber information. The Group Call Processing and Routing 404 and other system provisioning components interact with this subsystem.

Group Information Store—This module stores group related information keyed against a unique group id. The group information consists of a set of subscribed members and their privileges. A group may have members located across different regions within a national network. The RTX 102 that holds this information for a specific group is called the group home RTX 102. If a group call request arrives at a RG 302 that does not hold the requested group information, it identifies the group home RG 302 and fetches information from there. It might store that information in its cache temporarily.

Subscriber Data—This module stores information of a subscribed group user keyed against the subscriber MS-ISDN and/or internal member id. It stores the subscriber's registration information and the group ids of which he/she is a member. Please note that the subscriber data does not include the information about his/her current location. However, it may be possible to store whether a handset 120 is in its home network 304 or a foreign network 306 by comparing the system id that it sends during group voice registration. This information may be useful in terminating a call to a user directly instead of going to its home network 304.

4. System Management 426—This subsystem is responsible for managing the hardware and software systems of the RG 302. It has following major functional components: SNMP Agent 428, RG Chassis Management 430, N+K Redundancy 432, Audits and Overload Controls 434, Call Records 436 and Logging 438.

Presence Functionality Description for CDMA Network

The following steps are performed when a P2T subscriber roams into a foreign CDMA network 306.

1. The P2T client application in the handset 120 detects a System ID (SID)/Network ID (NID)/Registration Zone change and informs the RTX 102 in the home network 304 through SMS messaging, where the SMS message is routed to the home RTX 102, even though the message originates in a foreign network 306. Note that it is assumed that the home network 304 and foreign network 306 have an SMS delivery agreement.

2. The home RTX 102 processes the SMS message and validates the SID/NID/Registration Zone with its database. Since the subscriber is roaming into a foreign network 306, the SID/NID/Registration Zone will not match with any data in the home network 304 and the RTX 102 considers the subscriber as roaming outside the home network 304.

3. Once the home RTX 102 identifies that the subscriber as roaming into a foreign CDMA network 306, it sends a message to the P2T client application in the handset 120 through SMS messaging to inform the P2T client application of the addresses (NANP (North American Numbering Plan) numbers) of the RGs 302. Each RTX 102 is provisioned with the NANP numbers of at least two RGs 302 located in the home network 304 and connected to the foreign network 306.

4. The RTX 102 also pushes the subscriber's profile and group index information to those RGs 302.

Presence Functionality Description for GSM Network

The following steps are performed when a P2T subscriber roams into a foreign GSM network 306.

1. The P2T client application in the handset 120 detects a MCC (mobile country code)/MNC (mobile network code)/LACID (location area code identifier) change and informs the RTX 102 in the home network 304 through SMS messaging, where the SMS message is routed to the home RTX 102, even though the message is originated in foreign network 306. Again, it is assumed that the home network 304 and foreign network 306 have an SMS delivery agreement.

2. The subscriber's home RTX 102 processes the SMS message and validates the MCC/MNC/LACID with its database. Since the subscriber is roaming into a foreign network 306, the MCC/MNC/LACID will not match with any data in home network 304 and the RTX 102 considers the subscriber as roaming outside the home network 304.

3. Once the home RTX 102 identifies that the subscriber is roaming into a foreign network 306, it sends a message to the P2T client application in the handset 120 through SMS messaging to inform the P2T client application of the addresses (E.164 numbers) of the RGs 302. Each RTX 102 is provisioned with the addresses of at least two RGs 302 located in the home network 304 and connected to the foreign network 306.

4. The RTX 102 also pushes the subscriber's profile and group index information to those RGs 302.

Originating a Roaming P2T Call

When the roaming P2T subscriber wants to originate a P2T call, the P2T client application in the handset 120 sends a setup message to the foreign MSC 104 to establish a call with one of the RGs 302 (in a manner similar to a mobile originated, land terminated call). The RG 302 establishes a voice path to the P2T client application in the handset 120, and receives a Security Code (SC) and Dialed Digits (DD) from the P2T client application through the voice path. The RG 302 then authenticates the originating P2T subscriber, and analyzes the DD to establish various P2T calls by: (1) establishing a private call directly to the terminating leg, and/or (2) tunneling the call to the home RTX 102 so that the home RTX 102 can establish all the terminating legs.

The specifics of these steps are provided below.

Figure 5:
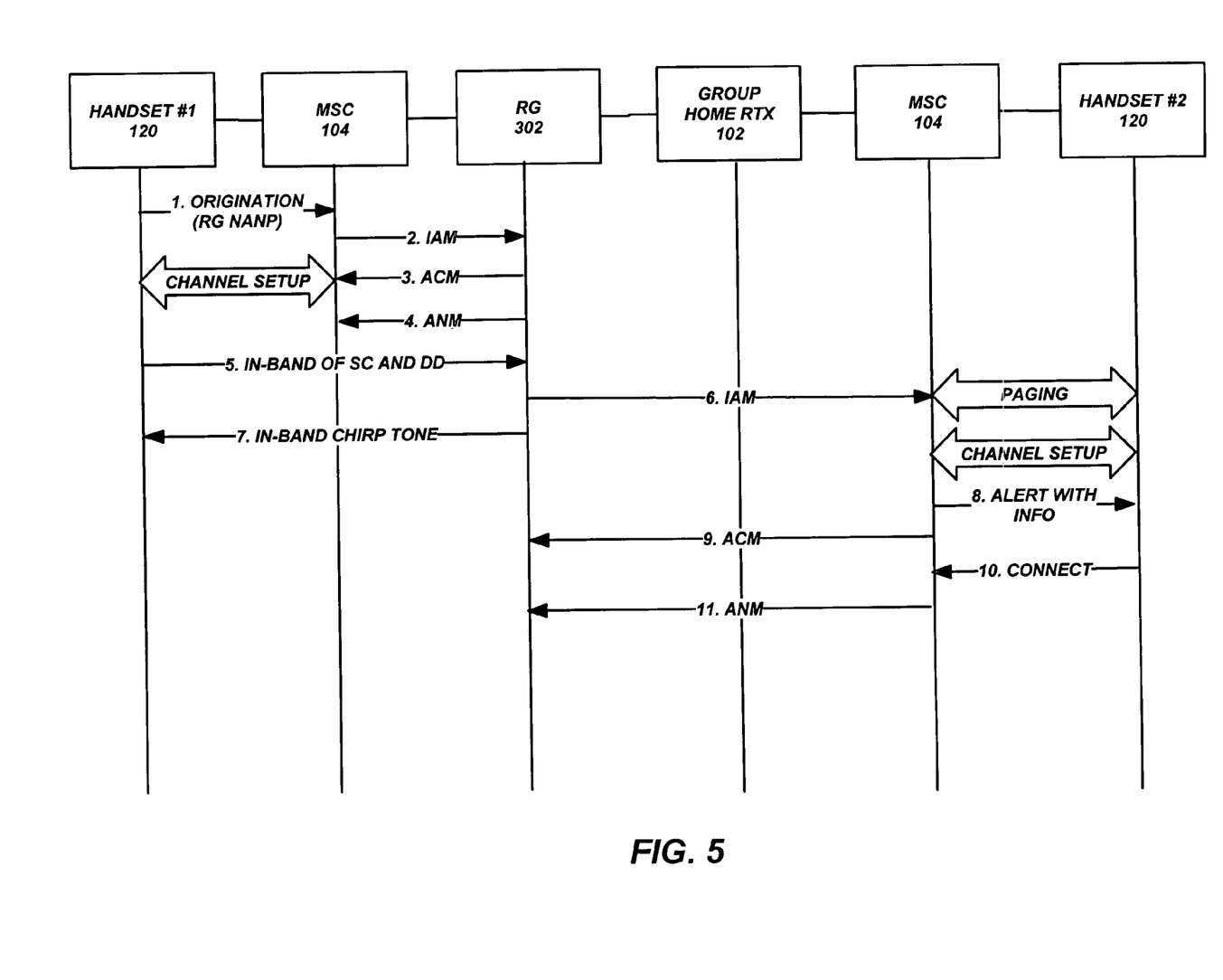
FIG. 5 is a diagram that illustrates the call flow for a push-to-talk call made by a roaming push-to-talk subscriber according to a preferred embodiment of the present invention.

FIG. 5 is a diagram that illustrates the call flow for a P2T call made by a roaming P2T subscriber according to a preferred embodiment of the present invention.

1. The first or originating handset 120 (identified in the figure as handset #1) requests a call origination from the MSC 104, using the NANP number of the RG 302.

2. The MSC 104 sends an IAM (Initial Address Message) message to the RG 302.

3. The RG 302, after receiving the LAM from the MSC 104, authenticates the P2T subscriber and then responds to the MSC 104 with an ACM (Address Complete Message), and subsequently an ANM (Answer Message).

4. The first handset 120 uses in-band signaling to transmit a security code (SC) and dialed digits (DD) to the RG 302 via the MSC 104. The RG 302 uses the security code and dialed digits to determine the group index.

5. The RG 302 sends an IAM (Initial Address Message) message, with the group index, to the group home RTX 102, which forwards the IAM on to the MSC 104 serving the second or terminating handset 120 (identified in the figure as handset #2).

6. The RG 302 sends an in-band chirp tone to the first handset 120, and starts voice buffering.

7. The MSC 104 triggers the paging procedure followed by the channel setup for the second handset 120.

8. Assuming that the second handset 120 responds to the page, the MSC 104 sends an "Alert with Info" message to the second handset 120 to trigger alerting at the second handset 120.

9. The MSC 104 responds to the RG 302 with an ACM (Address Complete Message), via the group home RTX 102.

10. The MSC 104 receives a connect from the second handset 120.

11. The MSC 104 sends an ANM (Answer Message) to the RG 302, via the group home RTX 102, which completes the one-way voice path from the originating handset 120 to terminating handset 120.

The above sequence differs somewhat depending on whether a P2T private or group call is being attempted. These differences are described below.

Originating a P2T Private Call

When the roaming P2T subscriber originates a private P2T call, the P2T client application in the handset 120 performs the following:

1. Dials out a Directory Number (DN), which is dedicated for the private call, to the RG 302.

2. When the call becomes active, the P2T client application needs to: a) wait for the expiration of the "DTMF dial attempt defer" duration, and then b) dial out the following sequence: 1) routing delimiter, 2) security code (SC), 3) routing delimiter, 4) dialed digits (DD) representing the private call, and 5) routing delimiter, via the bearer path and in a DTMF format.

The RG 302 performs the following:

1. Answer the call and set up the bearer path to the originating leg.

2. Collect all the DTMF digits, identify the private call, and set up the terminating leg directly, without involving the home RTX 102. Note that a chirp tone is provided by the RG 302 to the originating leg.

Originating a P2T Group Call

When the roaming P2T subscriber originates a group P2T call, the P2T client application in the handset 120 performs the following:

1. Dials out a Directory Number (DN), which is dedicated for the group call, to the RG 302.

2. When the call becomes active, the P2T client application needs to: a) wait for the expiration of the "DTMF dial attempt defer" duration, and then b) dial out the following sequence: 1) routing delimiter, 2) security code (SC), 3) routing delimiter, 4) dialed digits (DD) representing the group call and 5) routing delimiter, via the bearer path and in a DTMF format.

The RG 302 performs the following:

1. Answer the call and set up the bearer path toward the originating leg.

2. Collect all the DTMF digits, identify the group call, and set up the terminating leg by: a) tunneling the call to the group home RTX 102, or b) establishing terminating legs to members within the group. Note that, for option a), a chirp tone is provided by the group home RTX 102. On the other hand, for option b), the chirp tone is provided by the RG 302.

Call Termination to a Roamed P2T Subscriber

For a private P2T call, the RG 302 handles the terminating leg, whether the terminating P2T subscriber is currently roaming outside the home network 304 or not.

For a group P2T call, the RG 302 may or may not handle the terminating legs, whether the terminating P2T subscribers are currently roaming outside the home network 304 or not, based on the configuration.

Roaming Client De-Registration

When the P2T subscriber moves into its home network 304 from a foreign network 306, the P2T client application in the handset 120 updates its location by sending a message to the home RTX 102. Subsequent to this procedure, the P2T client application shall adopt a normal P2T call setup procedure.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for providing group voice services in a wireless network, comprising:

a plurality of wireless networks for making calls between mobile units, wherein the calls are initiated by call setup and in-band signaling within the wireless networks and voice frames for the calls are switched between the mobile unit across bearer paths in the wireless networks;

a real-time exchange that interfaces to a first one of the wireless networks to provide group voice services therein, wherein both the real-time exchange and the mobile units that use the group voice services communicate with each other using the call setup and in-band signaling within the first one of the wireless networks, and the real-time exchange switches the voice frames for the group voice services from an originating mobile unit to all terminating mobile units across the bearer paths in the wireless networks; and a roaming gateway that interfaces to the real-time exchange and a second one of the wireless networks to provide group voice services for mobile units roaming in the second one of the wireless networks, wherein both the roaming gateway and the mobile units that use the group voice services communicate with each other using the call setup and in-band signaling within the second one of the wireless networks, and the roaming gateway switches the voice frames for the group voice services from an originating mobile unit to all terminating mobile units across the bearer paths in the wireless networks.

2. The apparatus of claim 1, wherein the group voice services comprise instant two-way half-duplex voice messaging within a group of users of the wireless networks.

3. The apparatus of claim 2, wherein the instant two-way half-duplex voice messaging comprises a Push To Talk (P2T) service.

4. The apparatus of claim 1, wherein the first one of the wireless networks comprises a home network and the second one of the wireless networks comprises a foreign network.

5. The apparatus of claim 4, wherein the roaming gateway supports group voice services calls when mobile units roam from their home network into a foreign network.

6. The apparatus of claim 4, wherein the home network is a network operated by a subscriber's service provider and the foreign network is a network operated by another service provider.

7. The apparatus of claim 4, wherein the roaming gateway is connected to at least one mobile switching center within the foreign network, the mobile switching center within the foreign network routes a group voice services call to the roaming gateway, and the roaming gateway sets up the group voice services call.

8. The apparatus of claim 7, wherein, when a mobile unit roaming in the foreign network wants to originate a group voice services call, the mobile unit originates the call using a number for the roaming gateway, and the mobile switching center within the foreign network establishes the call with the roaming gateway.

9. The apparatus of claim 8, wherein the roaming gateway authenticates the mobile unit and establishes a voice path with the mobile unit.

10. The apparatus of claim 8, wherein the roaming gateway identifies a group using information from the mobile unit and terminates the call with other group members.

11. The apparatus of claim 10, wherein the roaming gateway establishes a call with the real-time exchange and the real-time exchange terminates the call with other group members.

12. A method of providing group voice services in a wireless network, comprising:

connecting a plurality of wireless networks together for handling calls between mobile units in the wireless networks, wherein the calls are initiated by call setup and in-band signaling within the wireless networks and voice frames for the calls are switched between the mobile unit across bearer paths in the wireless networks;

interfacing a real-time exchange to a first one of the wireless networks to provide group voice services therein, wherein both the real-time exchange and the mobile units that use the group voice services communicate with each other using the call setup and in-band signaling within the first one of the wireless networks, and the real-time exchange switches the voice frames for the group voice services from an originating mobile unit to all terminating mobile units across the bearer paths in the wireless networks; and interfacing a roaming gateway to the real-time exchange and a second one of the wireless networks to provide group voice services for mobile units roaming in the second one of the wireless networks, wherein both the roaming gateway and the mobile units that use the group voice services communicate with each other using the call setup and in-band signaling within the second one of the wireless networks, and the roaming gateway switches the voice frames for the group voice services from an originating mobile unit to all terminating mobile units across the bearer paths in the wireless networks.

13. The method of claim 12, wherein the group voice services comprise instant two-way half-duplex voice messaging within a group of users of the wireless networks.

14. The method of claim 13, wherein the instant two-way half-duplex voice messaging comprises a Push To Talk (P2T) service.

15. The method of claim 12, wherein the first one of the wireless networks comprises a home network and the second one of the wireless networks comprises a foreign network.

16. The method of claim 15, wherein the roaming gateway supports group voice services calls when mobile units roam from their home network into a foreign network.

17. The method of claim 15, wherein the home network is a network operated by a subscriber's service provider and the foreign network is a network operated by another service provider.

18. The method of claim 15, wherein the roaming gateway is connected to at least one mobile switching center within the foreign network, the mobile switching center within the foreign network routes a group voice services call to the roaming gateway, and the roaming gateway sets up the group voice services call.

19. The method of claim 18, wherein, when a mobile unit roaming in the foreign network wants to originate a group voice services call, the mobile unit originates the call using a number for the roaming gateway, and the mobile switching center within the foreign network establishes the call with the roaming gateway.

20. The method of claim 19, wherein the roaming gateway authenticates the mobile unit and establishes a voice path with the mobile unit.

21. The method of claim 19, wherein the roaming gateway identifies a group using information from the mobile unit and terminates the call with other group members.

22. The method of claim 21, wherein the roaming gateway establishes a call with the real-time exchange and the real-time exchange terminates the call with other group members.

* * * * *